(12) United States Patent
Thomas et al.

(10) Patent No.: US 11,549,637 B2
(45) Date of Patent: Jan. 10, 2023

(54) MULTI-ROTATION GIMBAL ASSEMBLY AND MOBILE PLATFORM INCORPORATING THE SAME

(71) Applicant: HONEYWELL INTERNATIONAL INC., Morris Plains, NJ (US)

(72) Inventors: Jijo Thomas, Bangalore (IN); Ramakrishna Rao P.V, Bangalore (IN); Varun Ananda, Bangalore (IN); Deepak Mahajan, Bangalore (IN); Renukaprasad N, Bangalore (IN); Subhashree Rajagopal, Bangalore (IN); Shouvik Das, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 288 days.

(21) Appl. No.: 16/915,122

(22) Filed: Jun. 29, 2020

(65) Prior Publication Data

US 2021/0348712 A1    Nov. 11, 2021

(30) Foreign Application Priority Data

May 11, 2020 (IN) .............................. 202011019816

(51) Int. Cl.
| | |
|---|---|
| *F16M 11/18* | (2006.01) |
| *F16M 13/02* | (2006.01) |
| *F16M 11/20* | (2006.01) |
| *G03B 17/56* | (2021.01) |

(52) U.S. Cl.
CPC ........... *F16M 11/18* (2013.01); *F16M 11/205* (2013.01); *F16M 13/02* (2013.01); *G03B 17/561* (2013.01)

(58) Field of Classification Search
CPC ........ F16M 11/18; F16M 11/08; F16M 11/12; F16M 11/205; F16M 13/02; G03B 17/591
See application file for complete search history.

(56) References Cited

U.S. PATENT DOCUMENTS

| | | | |
|---|---|---|---|
| 7,602,134 B1* | 10/2009 | Taylor | .................... G01C 19/16 439/11 |
| 7,936,984 B2* | 5/2011 | Greb | ....................... F16M 13/00 396/421 |
| 8,197,183 B2 | 6/2012 | Ward et al. | |
| 8,322,332 B2 | 12/2012 | Rogers | |
| 9,284,796 B2 | 3/2016 | Hoefler et al. | |
| 10,281,930 B2 | 5/2019 | Hutson | |
| 10,443,324 B2 | 10/2019 | Teo | |
| 11,070,735 B2* | 7/2021 | Koyama | ................. B64D 47/08 |
| 11,233,943 B2* | 1/2022 | Wang | .................. H04N 5/23206 |
| 11,287,081 B2* | 3/2022 | Bachar | ................. G02B 7/1805 |
| 2016/0176547 A1* | 6/2016 | Kalman | .............. F16M 11/2064 464/157 |
| 2018/0135798 A1 | 5/2018 | Griffin et al. | |

(Continued)

FOREIGN PATENT DOCUMENTS

| | | |
|---|---|---|
| EP | 3024726 A1 | 6/2016 |
| WO | 2019151112 A1 | 8/2019 |

(Continued)

*Primary Examiner* — Eret C McNichols
(74) *Attorney, Agent, or Firm* — Lorenz & Kopf, LLP

(57) ABSTRACT

A gimbal assembly is provided that allows for more than a single rotation about a rotational axis in both a first rotational direction and a second rotational direction.

20 Claims, 10 Drawing Sheets

(56) References Cited

U.S. PATENT DOCUMENTS

| | | |
|---|---|---|
| 2018/0331637 A1 | 11/2018 | Zhang |
| 2019/0162358 A1 | 5/2019 | Wang et al. |
| 2019/0317386 A1 | 10/2019 | Zhao et al. |
| 2020/0003362 A1 | 1/2020 | Su et al. |
| 2020/0284392 A1* | 9/2020 | Su ................... F16M 11/105 |
| 2021/0203826 A1* | 7/2021 | Saika ................. F16M 13/022 |
| 2022/0099243 A1* | 3/2022 | Rosheim ............. F16M 11/123 |
| 2022/0247898 A1* | 8/2022 | Li ..................... H04N 5/23203 |

FOREIGN PATENT DOCUMENTS

| | | |
|---|---|---|
| WO | 2020/024123 A1 | 2/2020 |
| WO | 2020042152 A1 | 3/2020 |

* cited by examiner

MULTI-ROTATION GIMBAL ASSEMBLY AND MOBILE PLATFORM INCORPORATING THE SAME

CROSS REFERENCE TO RELATED APPLICATION

This application claims priority to Indian Provisional Patent Application No. 202011019816, filed May 11, 2020, the entire content of which is incorporated by reference herein.

TECHNICAL FIELD

The present disclosure generally relates to gimbal assemblies, and more particularly relates to a gimbal assembly that allows multiple rotations about an axis, and to mobile platforms that incorporate the gimbal assembly.

BACKGROUND

A gimbal is a pivoted support that allows the rotation of a device about one or more axes. The devices mounted on a gimbal vary and may include, for example, a compass, various types of cameras (e.g., DSLR, thermal, IR) and laser devices, such as laser guiding and/or pointing devices.

Typically, gimbals are configured to rotate about one, two, or three perpendicular rotational axes. The increasing market interest in unmanned aerial vehicles (UAVs) for applications such as aerial photography, land surveying, thermal imaging, and surveillance has emphasized the importance of multiple rotation freedom of each axis. Unfortunately, presently known gimbals are limited to, at most, a single rotation about each rotational axis.

Hence, there is a need for a gimbal that allows for more than a single rotation about at least one rotational axis. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a gimbal assembly includes a mount flange, an anti-rotation pin, a gimbal, a cover, and a stop washer. The mount flange is configured to be fixedly mounted against rotation. The anti-rotation pin is coupled to, and extends from, the mount flange. The gimbal is rotationally mounted on the mount flange and is rotatable, relative to the mount flange, about a rotational axis in a first rotational direction and in a second rotational direction that is opposite the first rotational direction. The cover is fixedly mounted on the gimbal and is rotatable therewith about the rotational axis in the first rotational direction and in the second rotational direction. The cover includes a first engagement protrusion that extends from the cover toward the mount flange. The stop washer is rotationally mounted on the mount flange and is disposed between the cover and the mount flange. The stop washer is rotatable, relative to the mount flange, about the rotational axis in the first rotational direction and in the second rotational direction. The stop washer includes an anti-rotation protrusion and a rotation protrusion. The anti-rotation protrusion extends radially outwardly from the stop washer and has a first engagement surface and a second engagement surface. The rotation protrusion extends toward the cover. The stop washer is rotatable in the first rotational direction when the first engagement surface is not engaging the anti-rotation pin, is rotatable in the second rotational direction when the second engagement surface is not engaging the anti-rotation pin, prevents rotation of the cover beyond a first predetermined number of rotations in the first rotational direction when the first engagement surface is engaging the anti-rotation pin, and prevents rotation of the cover beyond a second predetermined number of rotations in the second rotational direction when the second engagement surface is engaging the anti-rotation pin.

In another embodiment, a gimbal assembly includes a mount flange, an anti-rotation pin, a gimbal, a cover, a gear washer, and a gear. The mount flange is configured to be fixedly mounted against rotation. The anti-rotation pin is coupled to, and extends from, the mount flange. The gimbal is rotationally mounted on the mount flange and is rotatable, relative to the mount flange, about a first rotational axis in a first rotational direction and in a second rotational direction that is opposite the first rotational direction. The cover is fixedly mounted on the gimbal and is rotatable therewith about the first rotational axis in the first rotational direction and in the second rotational direction. The cover includes a first engagement protrusion that extends from the cover toward the mount flange. The gear washer is rotationally mounted on the mount flange and is disposed between the cover and the mount flange. The gear washer is rotatable, relative to the mount flange, about the first rotational axis in the first rotational direction and in the second rotational direction. The gear washer includes a gear engagement protrusion and a rotation protrusion. The gear rotation protrusion extends radially outwardly from the gear washer. The gear is rotationally mounted on the mount flange and is rotatable, relative to the mount flange, about a second rotational axis in the first rotational direction and in the second rotational direction. The second rotational axis is offset from the first rotational axis. The gear includes a plurality of gear teeth and an anti-rotation protrusion. Each of the gear teeth is selectively engaged by the gear engagement protrusion. The anti-rotation protrusion extends toward the mount flange and has a first engagement surface and a second engagement surface. The gear is rotatable in the first rotational direction when the first engagement surface is not engaging the anti-rotation pin, is rotatable in the second rotational direction when the second engagement surface is not engaging the anti-rotation pin, prevents rotation of the cover beyond a first predetermined number of rotations in the first rotational direction when the first engagement surface is engaging the anti-rotation pin, and prevents rotation of the cover beyond a second predetermined number of rotations in the second rotational direction when the second engagement surface is engaging the anti-rotation pin.

In yet another embodiment, a mobile system includes a mobile platform and a gimbal assembly. The gimbal assembly is coupled to the mobile platform and is rotatable, by more than a single rotation, about a rotational axis. The gimbal assembly includes a mount flange, an anti-rotation pin, a gimbal, a cover, and a stop washer. The mount flange is configured to be fixedly mounted against rotation. The anti-rotation pin is coupled to, and extends from, the mount flange. The gimbal is rotationally mounted on the mount flange and is rotatable, relative to the mount flange, about the rotational axis in a first rotational direction and in a second rotational direction that is opposite the first rotational direction. The cover is fixedly mounted on the gimbal and is rotatable therewith about the rotational axis in the first rotational direction and in the second rotational direction. The cover includes a first engagement protrusion that extends from the cover toward the mount flange. The stop washer is rotationally mounted on the mount flange and is disposed between the cover and the mount flange. The stop washer is rotatable, relative to the mount flange, about the rotational axis in the first rotational direction and in the second rotational direction. The stop washer includes an anti-rotation protrusion and a rotation protrusion. The anti-rotation protrusion extends radially outwardly from the stop washer and has a first engagement surface and a second engagement surface. The rotation protrusion extends toward the cover. The stop washer is rotatable in the first rotational direction when the first engagement surface is not engaging the anti-rotation pin, is rotatable in the second rotational direction when the second engagement surface is not engaging the anti-rotation pin, prevents rotation of the cover beyond a first predetermined number of rotations in the first rotational direction when the first engagement surface is engaging the anti-rotation pin, and prevents rotation of the cover beyond a second predetermined number of rotations in the second rotational direction when the second engagement surface is engaging the anti-rotation pin.

Furthermore, other desirable features and characteristics of the gimbal assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
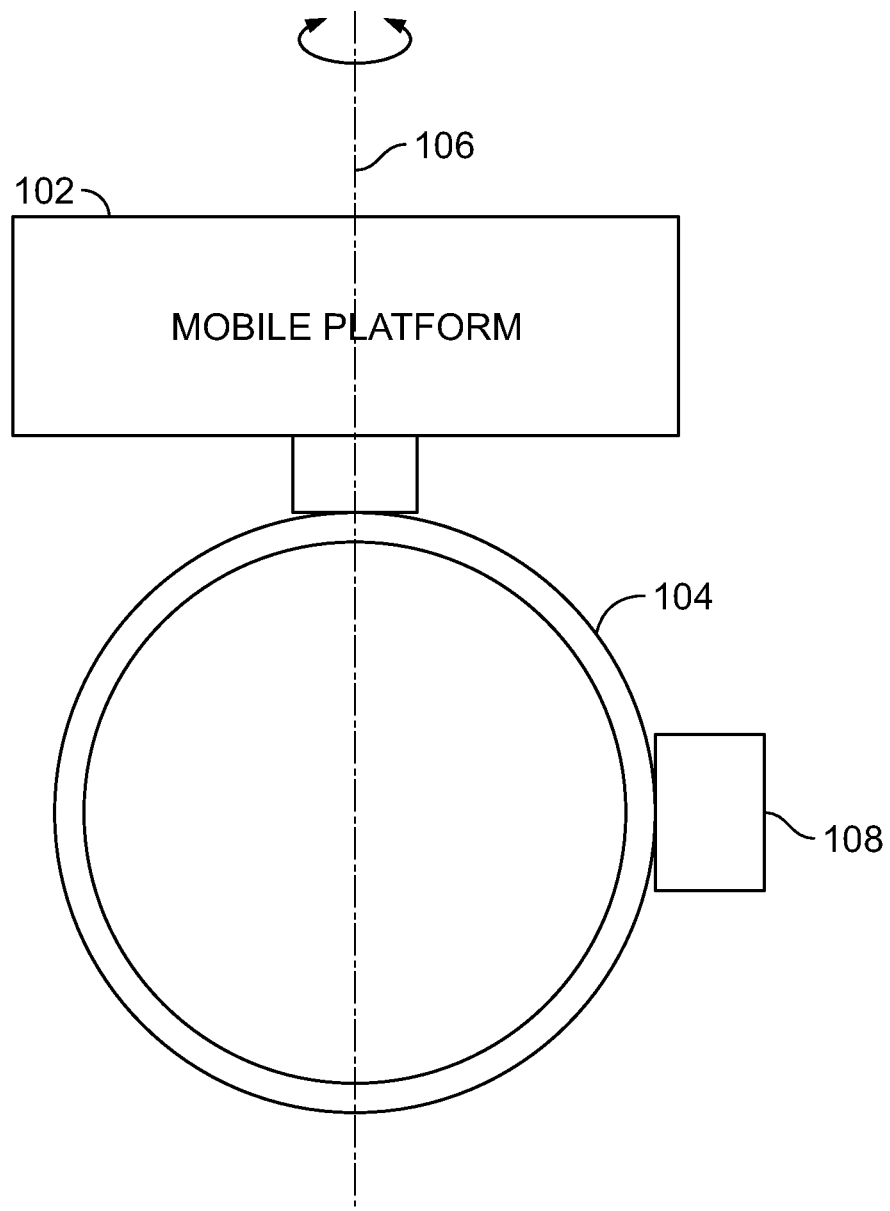
FIG. 1 depicts a simplified diagram of one embodiment of a mobile system.

Referring to FIG. 1, a simplified diagram of a mobile system 100 is depicted and includes a mobile platform 102 and a gimbal assembly 104. The mobile platform 102 may be any one of numerous types of mobile devices including, for example, various types of vehicles such as bicycles, motor vehicles (e.g., motorcycles, cars, trucks, buses), railed vehicles (e.g., trains, trams), watercraft (e.g., ships, boats, submarines), amphibious vehicles (e.g., screw-propelled vehicle, hovercraft), aircraft (e.g., airplanes, helicopters, unmanned aerial vehicles (UAVs)) and spacecraft.

Regardless of the how the mobile platform is implemented, the gimbal assembly 104 is coupled to the mobile platform 102 and is rotatable about at least one rotational axis 106. More specifically, the gimbal assembly 104 is rotatable about the rotational axis 106 by more than a single rotation (i.e., multi-rotation). It will be appreciated that although, for the sake of clarity, the gimbal assembly is depicted as being multi-rotational about the one rotational axis 106, it could also be configured to rotate about two or more rotational axes.

As FIG. 1 also depicts, a device 108 is coupled to the gimbal assembly 104. The device 108 is thus rotatable with the gimbal assembly 104 about the rotational axis. The device 108 may be variously configured and implemented. Some non-limiting examples of suitable devices include one or more of a compass, a camera, and a laser.

No matter the specific type of device 108, it is noted that the gimbal assembly 104 may be variously configured to implement this multi-rotational function. One configuration is depicted in FIGS. 2-4 and with reference thereto will now be described.

Figure 2:
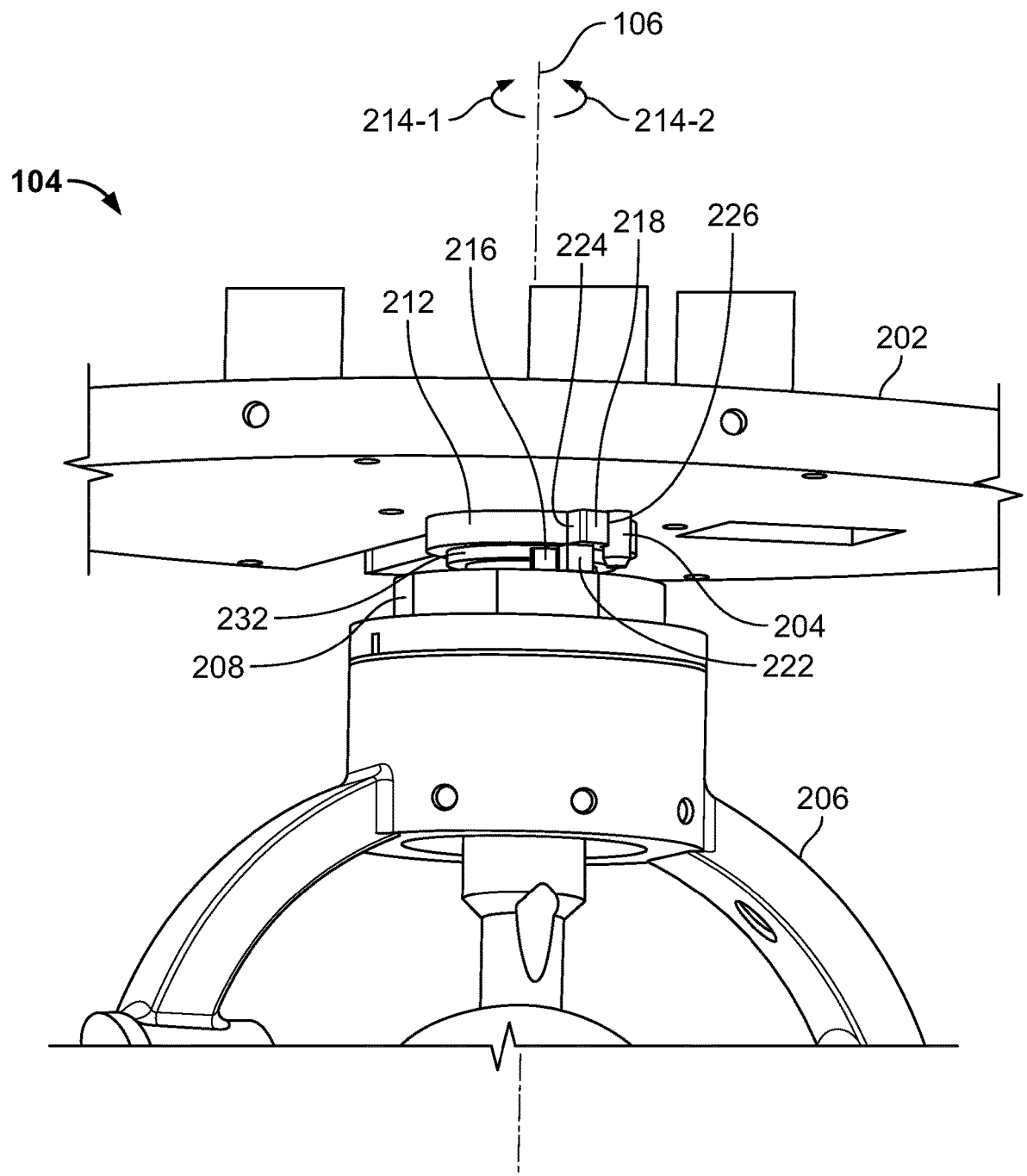
FIGS. 2-4 depict various views of one embodiment of a gimbal assembly that may be used in the mobile system of FIG. 1.
Figure 3:
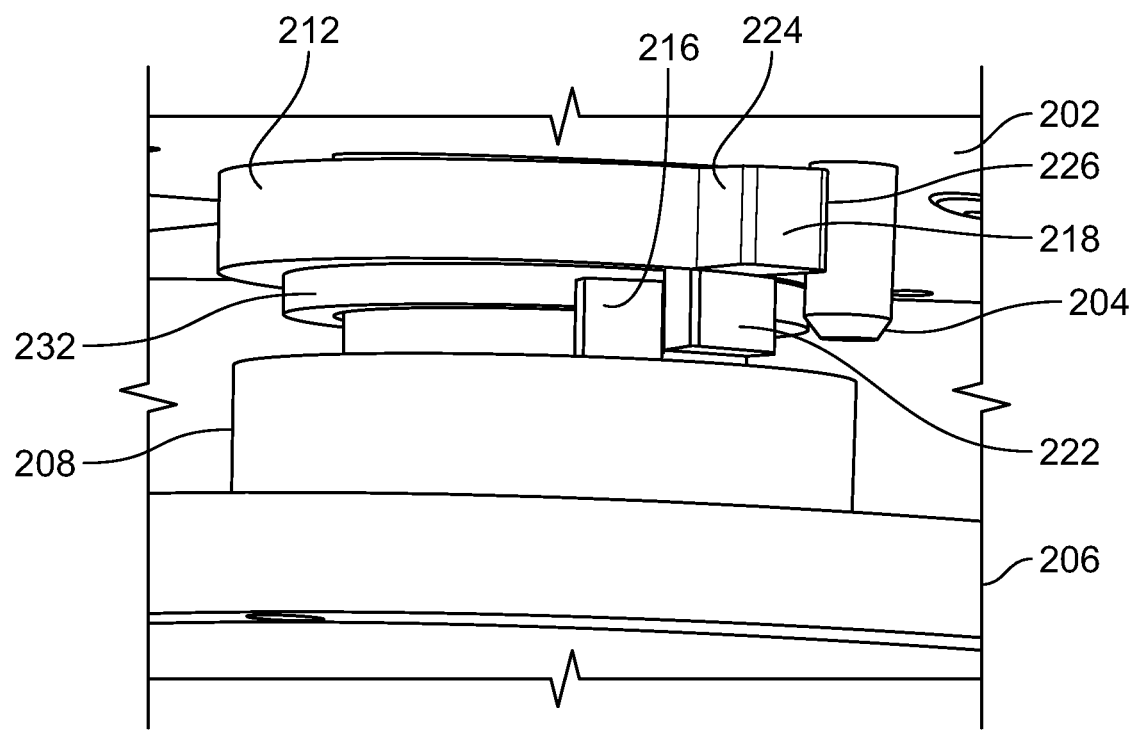
Figure 4:
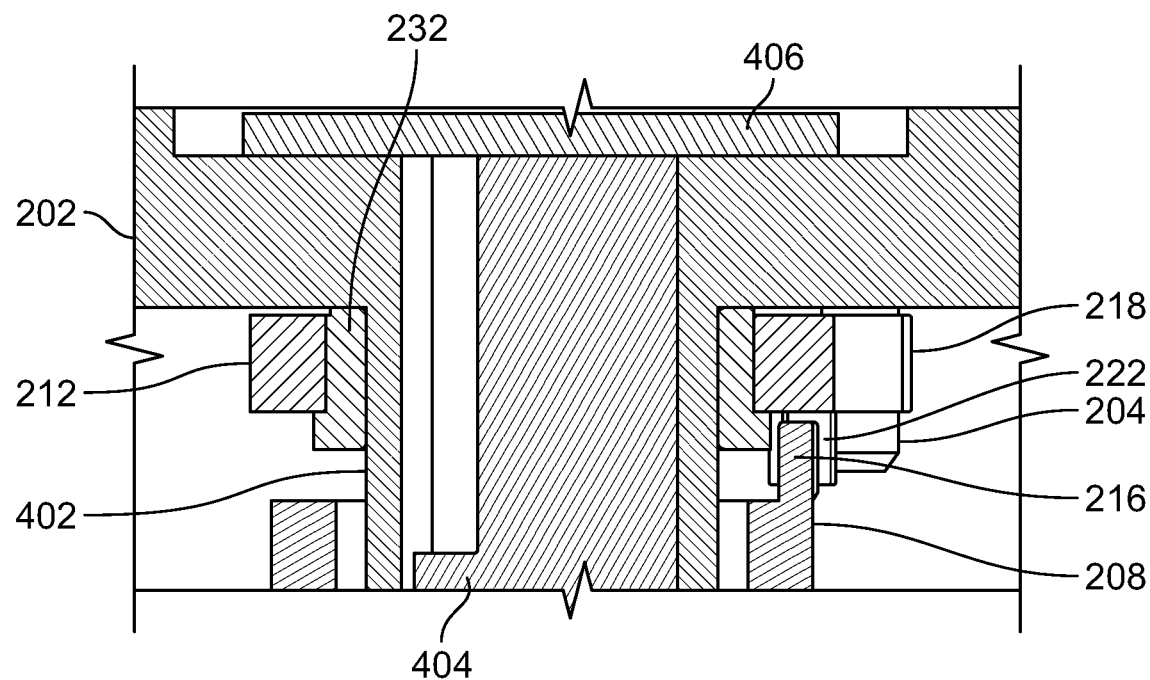

The gimbal assembly 104 depicted in FIGS. 2-4 includes a mount flange 202, an anti-rotation pin 204, a gimbal 206, a cover 208, and a stop washer 212. The mount flange 202, which is used to couple the gimbal assembly 104 to the mobile platform 102, is fixedly mounted against rotation and, at least in the depicted embodiment, includes a shaft 402 (see FIG. 4). The anti-rotation pin 204 is coupled to, and extends from, the mount flange 202. In the depicted embodiment, the anti-rotation pin 204 extends perpendicularly from the mount flange 202. It will be appreciated, however, that the anti-rotation pin 204 could, in other embodiments, extend non-perpendicularly from the mount flange 202.

The gimbal 206 is rotationally mounted on the mount flange 202 and is rotatable, relative to the mount flange 202, about the rotational axis 106. More specifically, the gimbal 206 is rotatable in a first rotational direction 214-1 and in a second rotational direction 214-2 that is opposite the first rotational direction 214-1. The manner in which the gimbal 206 is rotationally mounted on the mount flange 202 may vary. For example, it may be mounted via a gimbal shaft 404, which extends through the mount flange shaft 402, and a suitable bearing assembly 406 (see FIG. 4).

The cover 208 is fixedly mounted on the gimbal 206 and is thus rotatable therewith, in the first and in second rotational directions 214-1, 214-2, about the rotational axis 106. The cover 208 surrounds the mount flange shaft 402 and includes a first engagement protrusion 216 that extends therefrom. Specifically, the first engagement protrusion 216 extends from the cover 208 toward the mount flange 202.

The stop washer 212 is rotationally mounted on the mount flange 202 and is disposed between the cover 208 and the mount flange 202. The stop washer 214 is rotatable, relative to the mount flange 202, about the rotational axis 106 in the first and in second rotational directions 214-1, 214-2. The stop washer 212 surrounds the mount flange shaft 402 and includes an anti-rotation protrusion 218 and a rotation protrusion 222. The anti-rotation protrusion 218 extends radially outwardly from the stop washer 212 and has a first engagement surface 224 and a second engagement surface 226. The rotation protrusion 222 extends toward the cover 208 and, as will now be discussed, is selectively engaged by the first engagement protrusion 216, thereby causing rotation of the stop washer 212. The anti-rotation protrusion, as will also be discussed, selectively engages the anti-rotation pin 204, thereby selectively preventing rotation of both the stop washer 212 and the cover 206. In the depicted embodiment, the gimbal assembly 104 additionally includes a guide washer 232. The guide washer 232, as shown most clearly in FIG. 4, is disposed between the stop washer 212 and the mount flange shaft 402. The guide washer 232 is fixedly mounted on the mount flange shaft 402, and the stop washer 212 rotatable relative to the guide washer 232.

In particular, the stop washer 212 is rotatable in the first rotational direction 214-1 when the first engagement surface 224 is not engaging the anti-rotation pin 204, and is rotatable in the second rotational direction 214-2 when the second engagement surface 226 is not engaging the anti-rotation pin 204. The stop washer 212 also prevents rotation of the cover 208 beyond a first predetermined number of rotations in the first rotational direction 214-1 when the first engagement surface 224 is engaging the anti-rotation pin 204, and prevents rotation of the cover 208 beyond a second predetermined number of rotations in the second rotational direction 214-2 when the second engagement surface 226 is engaging the anti-rotation pin 204.

For example, when the gimbal 206, cover 208, and stop washer 212 are in the position depicted in FIG. 3, it is seen that the first engagement protrusion 216 is engaging the rotation protrusion 222 and the second engagement surface 226 is engaging the anti-rotation pin 204. Thus, the cover 208 and gimbal 206 are prevented from rotating in the second rotational direction 214-2. However, the cover 208 and gimbal 206 may rotate in the first rotational direction 214-1. Indeed, if the cover 208 and gimbal 206 are rotated in the first rotational direction 214-1, the first engagement protrusion 216 will disengage the rotation protrusion 222 and then reengage the rotation protrusion 222 when the cover 208 and gimbal 206 have rotated about a single rotation in the first rotational direction 214-1. The stop washer 212 will remain stationary, and not rotate, until the rotation protrusion 222 is reengaged by the first engagement protrusion 216.

Before proceeding further, it should be noted that the term "about" is used herein because, due to the physical dimensions of the first engagement protrusion 216 and the rotation protrusion 222, the first engagement protrusion 216 will clearly reengage the rotation protrusion 222 before the cover 208 and gimbal 206 will complete an entire 360-degree (e.g., 2π-radians) rotation. It is further noted that the dimensions and spacing of the first engagement protrusion 216 and the anti-rotation pin 204 allow the first engagement protrusion to pass by, and not engage, the anti-rotation pin 204.

Returning to the description, when the first engagement protrusion 216 does reengage the rotation protrusion 222, the cover 208, gimbal 206, and stop washer 212 will now all rotate in the first rotational direction 214-1. This rotation will continue until the first engagement surface 224 engages the anti-rotation pin 204, at which point the stop washer 212 prevents further rotation of the cover 208 and gimbal. In the depicted embodiment, the cover 208 and gimbal 206 can rotate about two complete revolutions in the first rotational direction. Thus, the above-referenced first predetermined number of rotations is about two.

Although further rotation in the first rotational direction 214-1 is prevented, the cover 208 and gimbal 206 may rotate in the second rotational direction 214-1. This, as noted above, is because the second engagement surface 226 is not engaging the anti-rotation pin 204. Thus, if the cover 208 and gimbal 206 are rotated in the second rotational direction 214-2, the first engagement protrusion 216 will disengage the rotation protrusion 222 and then reengage the rotation protrusion 222 when the cover 208 and gimbal 206 have rotated about a single rotation in the second rotational direction 214-2. Again, the stop washer 212 will remain stationary, and not rotate, until the rotation protrusion 222 is reengaged by the first engagement protrusion 216.

Thereafter, when the first engagement protrusion 216 reengages the rotation protrusion 222, the cover 208, gimbal 206, and stop washer 212 will now all rotate in the second rotational direction 214-2. This rotation will continue until the second engagement surface 224 engages the anti-rotation pin 204, at which point the stop washer 212 prevents further rotation of the cover 208 and gimbal 206. Here, too, the cover 208 and gimbal 206 can rotate about two complete revolutions in the second rotational direction. Thus, the above-referenced second predetermined number of rotations is about two.

It will be appreciated that in other embodiments the stop washer 212 could be configured such that the cover 208 and gimbal 206 are rotatable less than two rotations in either, or both, the first and second rotational directions 214-1, 214-2. This may be accomplished by including, for example, a second anti-rotation protrusion. In particular, by including a second anti-rotation protrusion 502 that is separated from the first anti-rotation protrusion 218 by a predetermined distance (i.e., arc length). For example, with reference now to FIG. 5, an embodiment is depicted in which the first and second anti-rotation protrusions 218, 502 are separated by 90-degrees. With this configuration, the second anti-rotation protrusion 502 has third and fourth engagement surfaces 504, 506, and the cover 208 (and thus the gimbal 206) is rotatable about 1.5 number of rotations in the first and second rotational directions 214-1, 214-2. That is, the first and second predetermined number of rotations are both 1.5.

Figure 5:
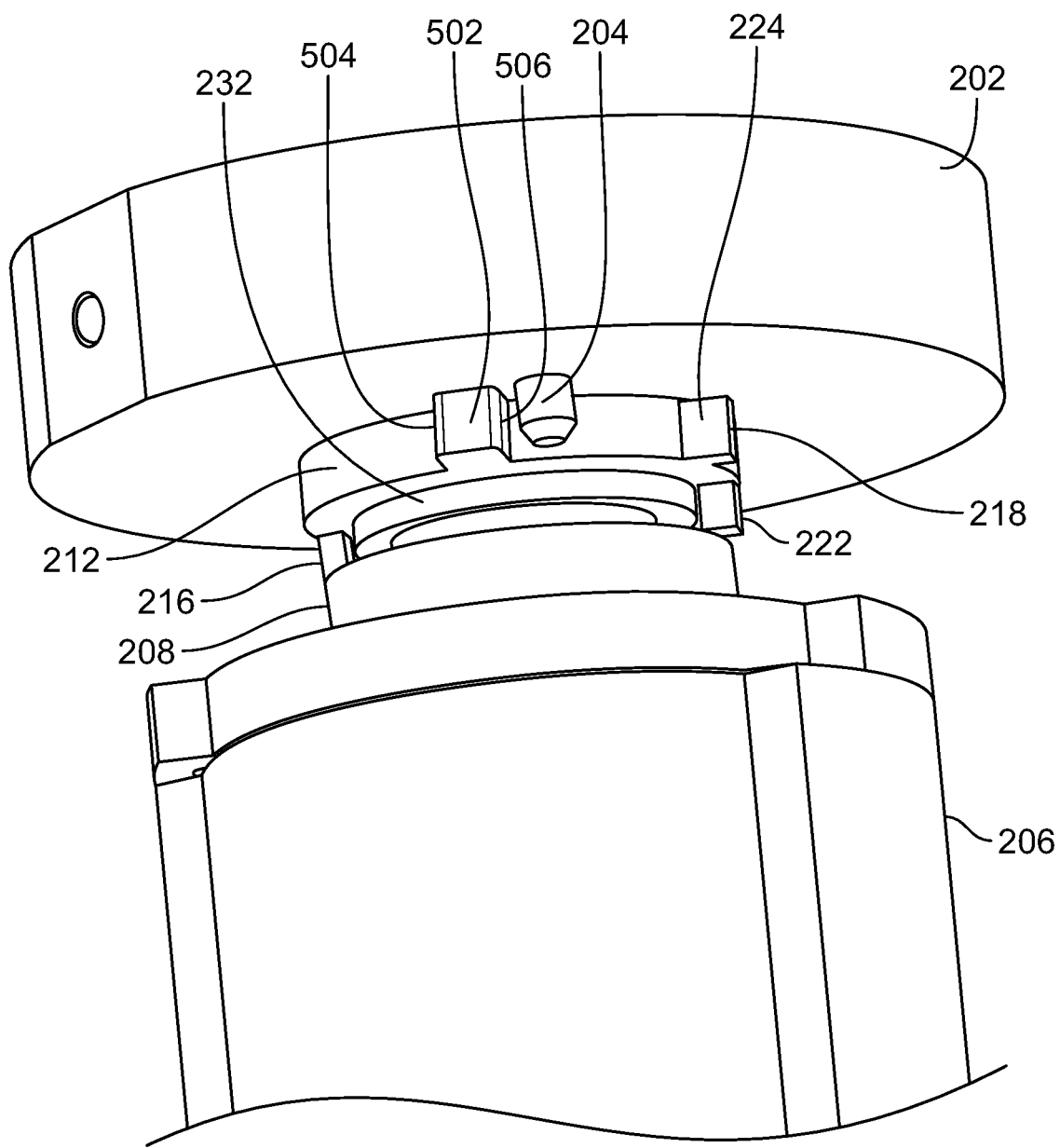
FIG. 5 depicts another embodiment of a gimbal assembly that may be used in the mobile system of FIG. 1.

For example, when the gimbal 206, cover 208, and stop washer 212 are in the positions depicted in FIG. 5, if the cover 208 and gimbal 206 are rotated in the first rotational direction 214-1, when the first engagement protrusion 216 engages the first rotation protrusion 222, the rotation in the first rotational direction will initially be limited to only about ¾ of a rotation. That is, when the cover 208 and gimbal 206 are initially rotated in the first rotational direction 214-1, the stop washer 212 will remain stationary, and not rotate, until the first rotation protrusion 222 is engaged by the first engagement protrusion 216. This occurs, when the cover 208 and gimbal 206 have rotated about a ½ of a rotation in the first rotational direction 214-1. Thereafter, the cover 208, gimbal 206, and stop washer 212 will now all rotate in the first rotational direction 214-1. This rotation will continue until the first engagement surface 224 engages the anti-rotation pin 204, at which point the stop washer 212 prevents further rotation of the cover 208 and gimbal.

Although further rotation in the first rotational direction 214-1 is prevented, the cover 208 and gimbal 206 may rotate in the second rotational direction 214-1. This is because the second engagement surface 226 is not engaging the anti-rotation pin 204. Thus, if the cover 208 and gimbal 206 are rotated in the second rotational direction 214-2, the first engagement protrusion 216 will disengage the rotation protrusion 222 and then reengage the rotation protrusion 222 when the cover 208 and gimbal 206 have rotated about a single rotation in the second rotational direction 214-2. Again, the stop washer 212 will remain stationary, and not rotate, until the rotation protrusion 222 is reengaged by the first engagement protrusion 216.

Thereafter, when the first engagement protrusion 216 reengages the rotation protrusion 222, the cover 208, gimbal 206, and stop washer 212 will now all rotate in the second rotational direction 214-2. This rotation will continue until the fourth engagement surface 506 engages the anti-rotation pin 204, at which point the stop washer 212 prevents further rotation of the cover 208 and gimbal 206. Here, the cover 208 and gimbal 206 can rotate about 1.5 revolutions in the second rotational direction.

Although further rotation in the second rotational direction 214-2 is prevented, the cover 208 and gimbal 206 may rotate again in the first rotational direction 214-1. Thus, if the cover 208 and gimbal 206 are indeed rotated in the first rotational direction 214-1, the first engagement protrusion 216 will disengage the rotation protrusion 222 and then reengage the rotation protrusion 222 when the cover 208 and gimbal 206 have rotated about a single rotation in the first rotational direction 214-1. Again, the stop washer 212 will remain stationary, and not rotate, until the rotation protrusion 222 is reengaged by the first engagement protrusion 216.

Thereafter, when the first engagement protrusion 216 reengages the rotation protrusion 222, the cover 208, gimbal 206, and stop washer 212 will now all rotate in the first rotational direction 214-2. This rotation will continue until the first engagement surface 224 engages the anti-rotation pin 204, at which point the stop washer 212 prevents further rotation of the cover 208 and gimbal 206. Thus, the cover 208 and gimbal 206 can rotate about 1.5 revolutions in the second rotational direction.

It will be appreciated that in still other embodiments the gimbal assembly 104 could be configured such that the cover 208 and gimbal 206 can be rotated more than two rotations in both the first and second rotational directions 214-1, 214-2. This can be accomplished by including one or more one or more rotary washers between the cover 208 and the stop washer 212.

Figure 6:
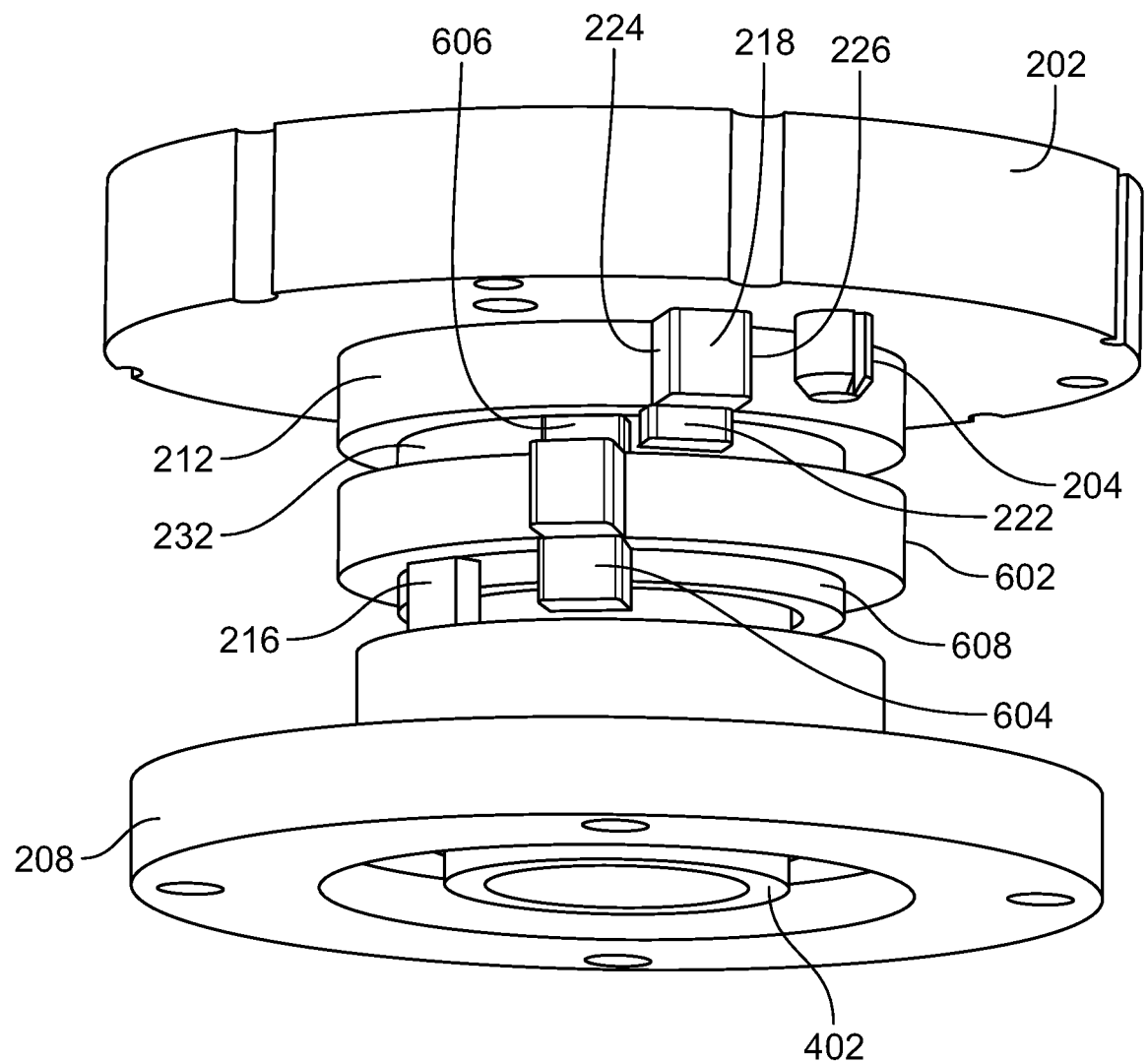
FIG. 6 depicts another embodiment of a gimbal assembly that may be used in the mobile system of FIG. 1.

For example, in the embodiment depicted in FIG. 6, a single rotary washer 602 is rotationally mounted on the mount flange 202 between the cover 208 and the stop washer 212. The rotary washer 602 is rotatable about the rotational axis 106 in the first rotational direction 214-1 and in the second rotational direction 214-2 and includes at least a second engagement protrusion 604 and a third engagement protrusion 606. As FIG. 6 further depicts, the second engagement protrusion 604 extends toward the cover 208, the third engagement protrusion 606 extends toward the stop washer 212. As FIG. 6 also depicts, a second guide washer 608, which is configured similar to the first guide washer 232, is fixedly mounted on the mount flange shaft 402, and the rotary washer 602 is rotatable relative to the second guide washer 608. As may be appreciated, with this embodiment the cover 208 (and gimbal 206) can be rotated about three rotations in the first and second rotational directions 214-1, 214-2. Thus, the above-referenced first and second predetermined number of rotations are both about three.

Figure 7:
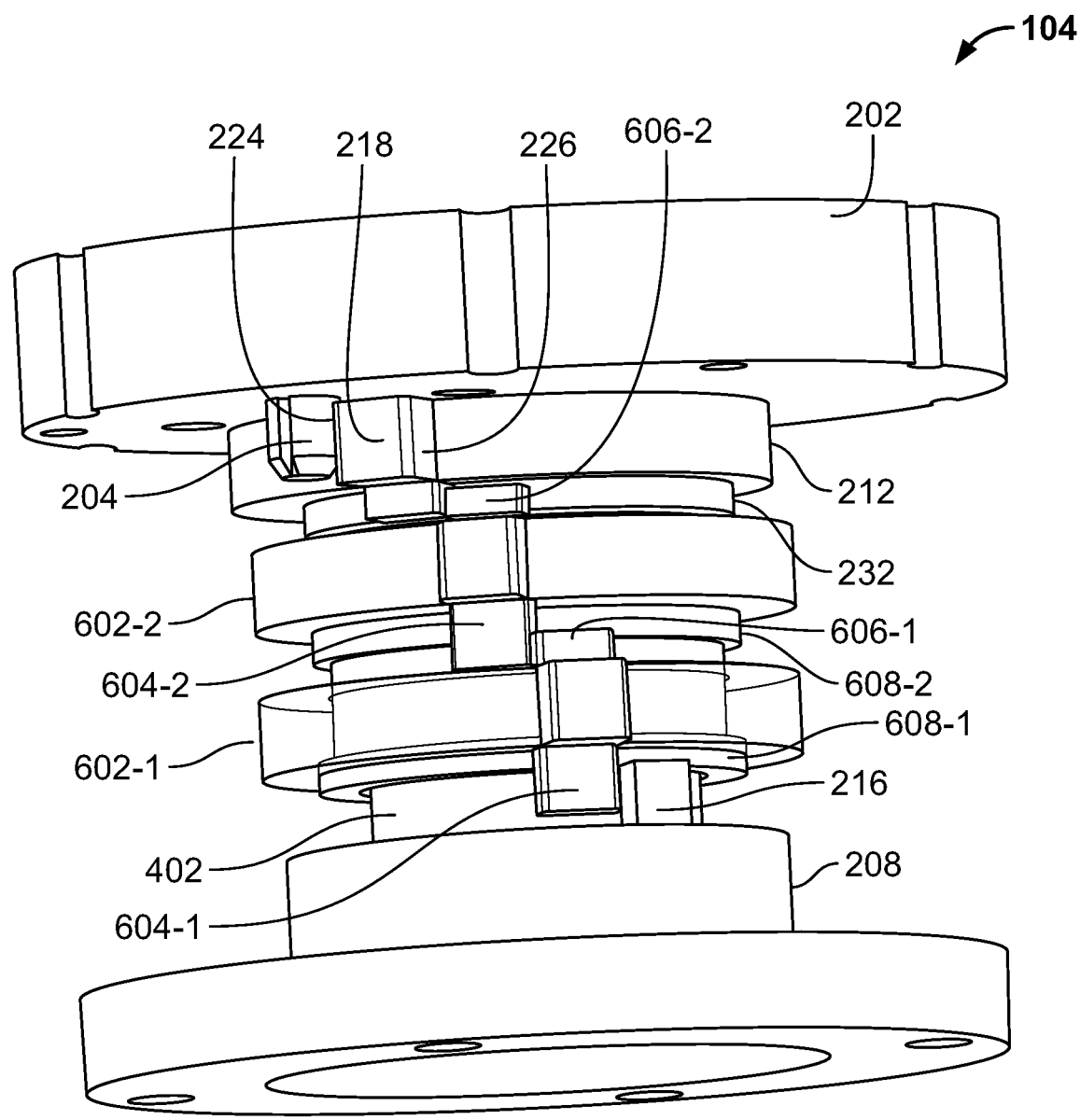
FIG. 7 depicts another embodiment of a gimbal assembly that may be used in the mobile system of FIG. 1.
Figure 8:
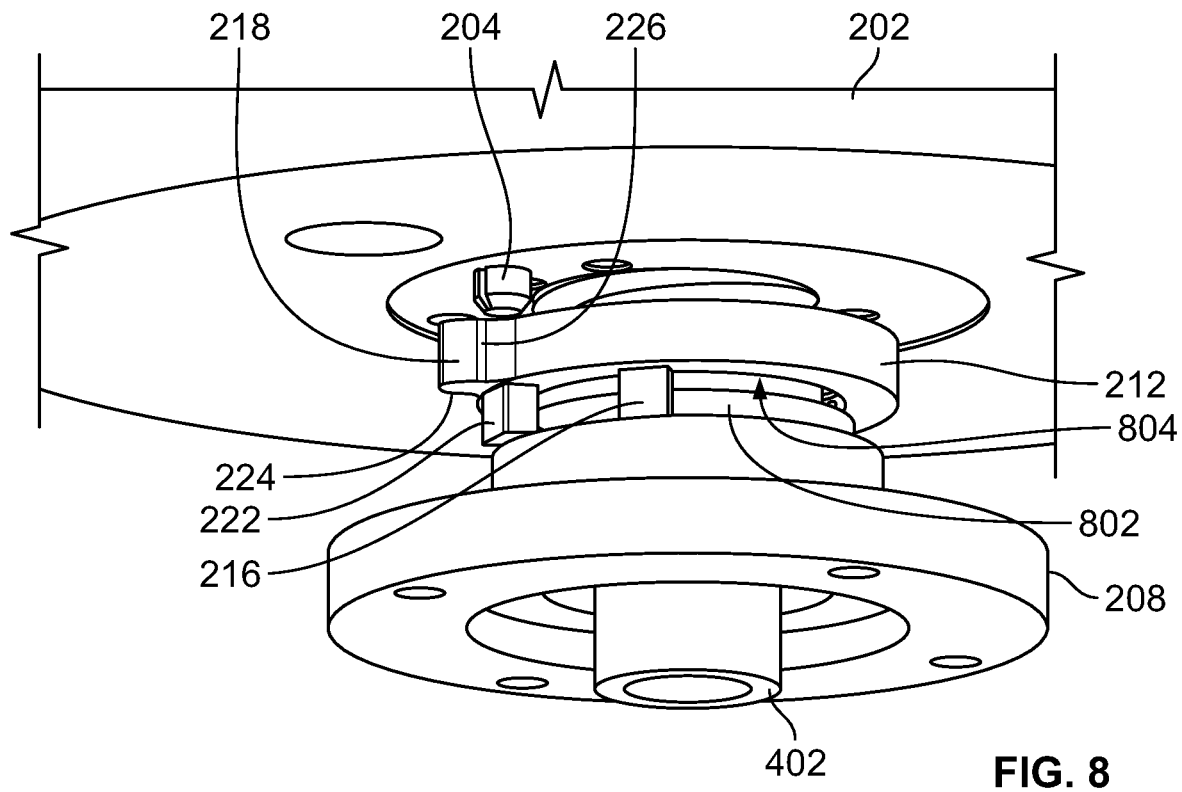
FIGS. 8-10 depict various views of another embodiment of a gimbal assembly that may be used in the mobile system of FIG. 1.
Figure 9:
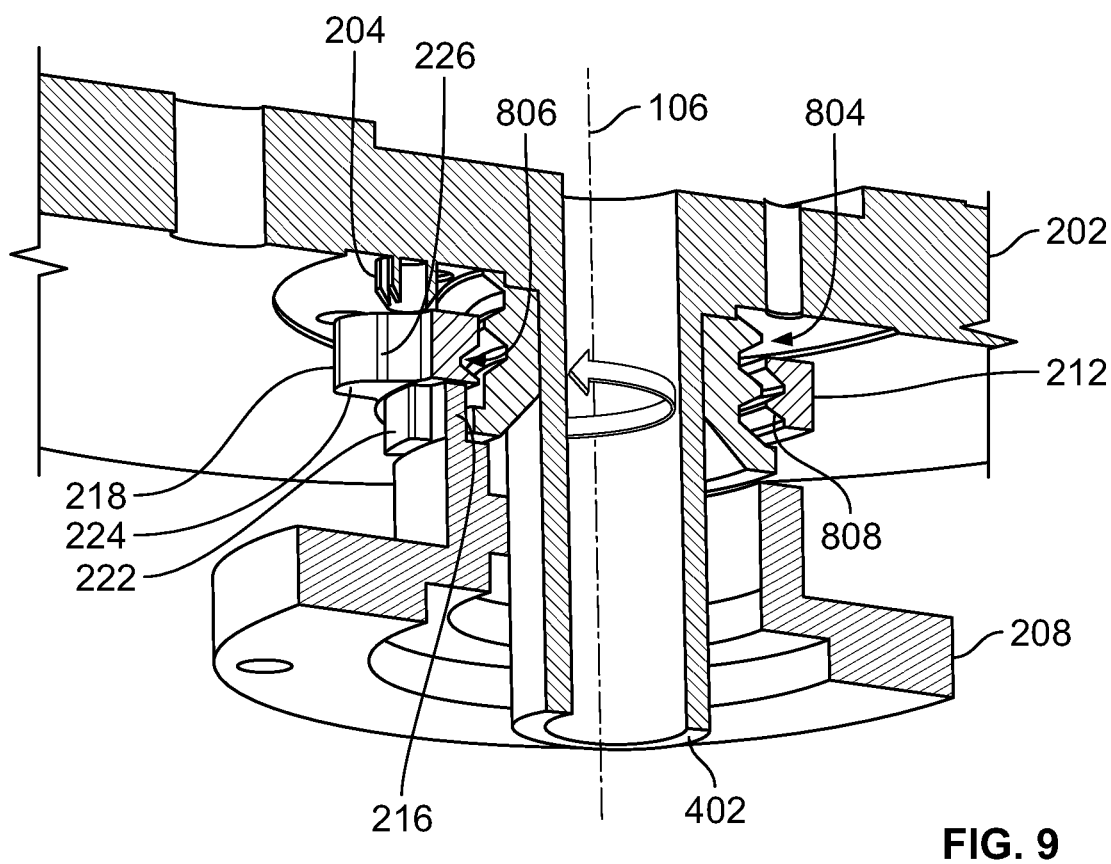
Figure 10:
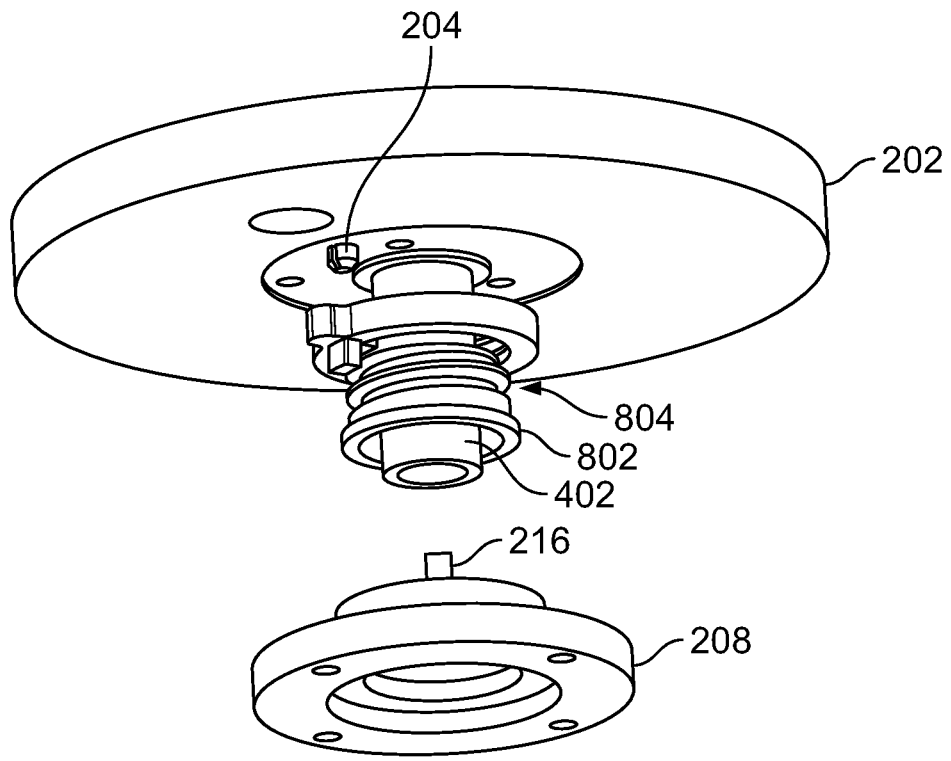
Figure 11:
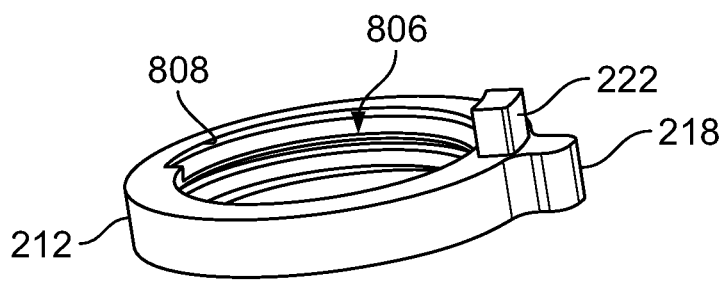
FIG. 11 depicts a plan view of a stop washer that may be used in the embodiment depicted in FIGS. 8-10.
Figure 12:
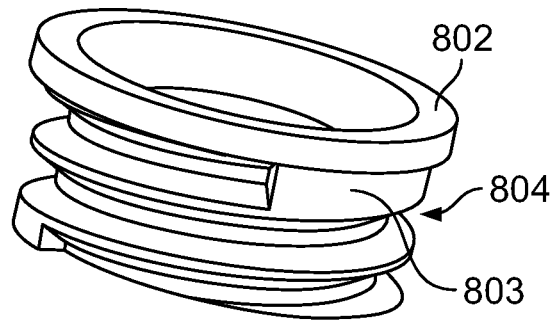
FIG. 12 depicts a plan view of a structure that may be used in the embodiment depicted in FIGS. 8-10.

The gimbal assembly 104 could also be configured with a plurality of rotary washers. For example, in the embodiment depicted in FIG. 7, the gimbal assembly 104 includes two rotary washers 602-1, 602-2, each of which is rotatable about the rotational axis 106 in the first rotational direction 214-1 and in the second rotational direction 214-2 and each of which includes at least a second engagement protrusion 604 (604-1, 604-2) and a third engagement protrusion 606 (606-1, 606-2). As FIG. 7 also depicts, a plurality of second guide washers 608 (608-1, 608-2) are also included, and each rotary washer 602 is rotatable relative to its second guide washer 608. With this embodiment, the cover 208 (and gimbal 206) can be rotated about four rotations in the first and second rotational directions 214-1, 214-2. As such, the above-referenced first and second predetermined number of rotations are both about three.

If needed or desired, the gimbal assembly 104 may be configured with more than two rotary washers 602. Indeed, it could be implemented with N-number of rotary washers (602-1, 602-2, . . . 602-N), each of which is rotatable about the rotational axis 106 in the first rotational direction 214-1 and in the second rotational direction 214-2 and each of which includes at least a second engagement protrusion 604 (604-1, 604-2, . . . 604-N) and a third engagement protrusion 606 (606-1, 606-2, . . . 606-N). As may be appreciated, N-number of second guide washers 608 (608-1, 608-2, . . . 608-N) are also included, and each rotary washer 602 is rotatable relative to its second guide washer 608. With these embodiments, the cover 208 (and gimbal 206) can be rotated about (N+2)-number of rotations in the first and second rotational directions 214-1, 214-2. As such, the above-referenced first and second predetermined number of rotations are both about N+2.

Turning now to FIGS. 8-12, yet another embodiment is depicted. In this embodiment, the gimbal assembly 104 includes the mount flange 202, the anti-rotation pin 204, the gimbal 206 (not depicted), the cover 208, and the stop washer 212, and additionally includes a stationary structure 802. This stationary structure 802 is fixedly coupled to the mount flange 202, and more specifically to the mount flange shaft 402. The stationary structure 802 has first helical threads 804 formed on an outer surface 803 thereof. The first helical threads 804 engage and mate with second helical threads 806 that are formed on an inner surface 808 of the stop washer 212. With this embodiment, the first and second predetermined number of rotations are both greater than one. Indeed, the first and second predetermined number of rotations can be any one of numerous numbers based on the pitch and length of the first and second helical threads 804, 806.

Figure 13:
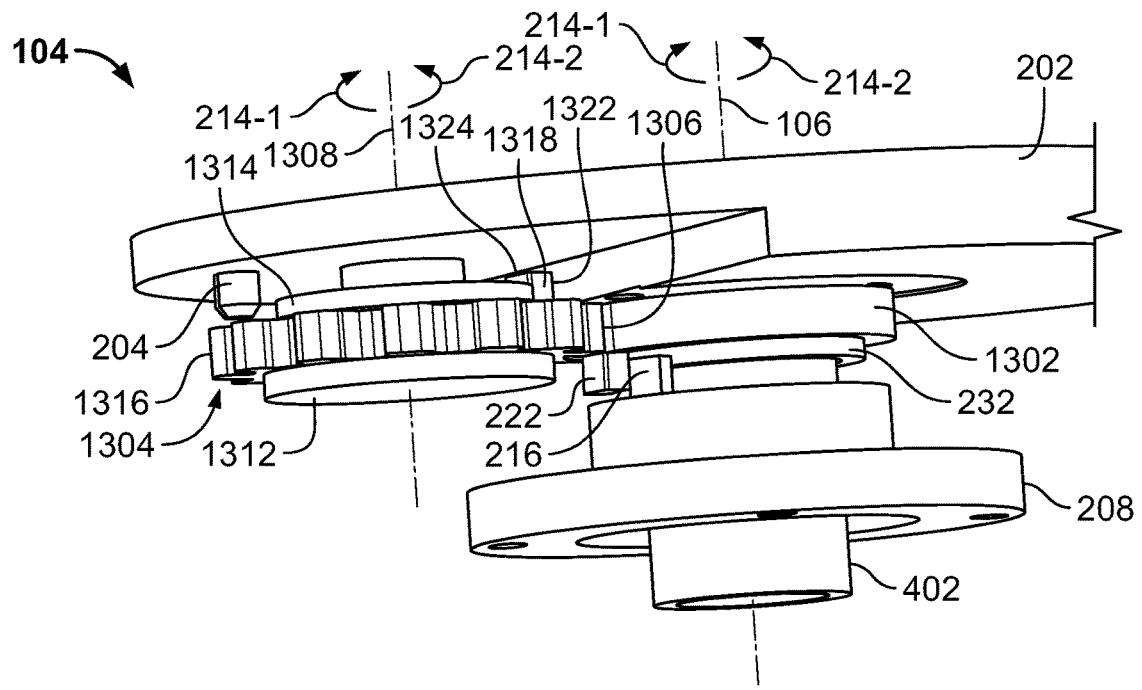
FIGS. 13 and 14 depict various views of another embodiment of a gimbal assembly that may be used in the mobile system of FIG. 1.
Figure 14:
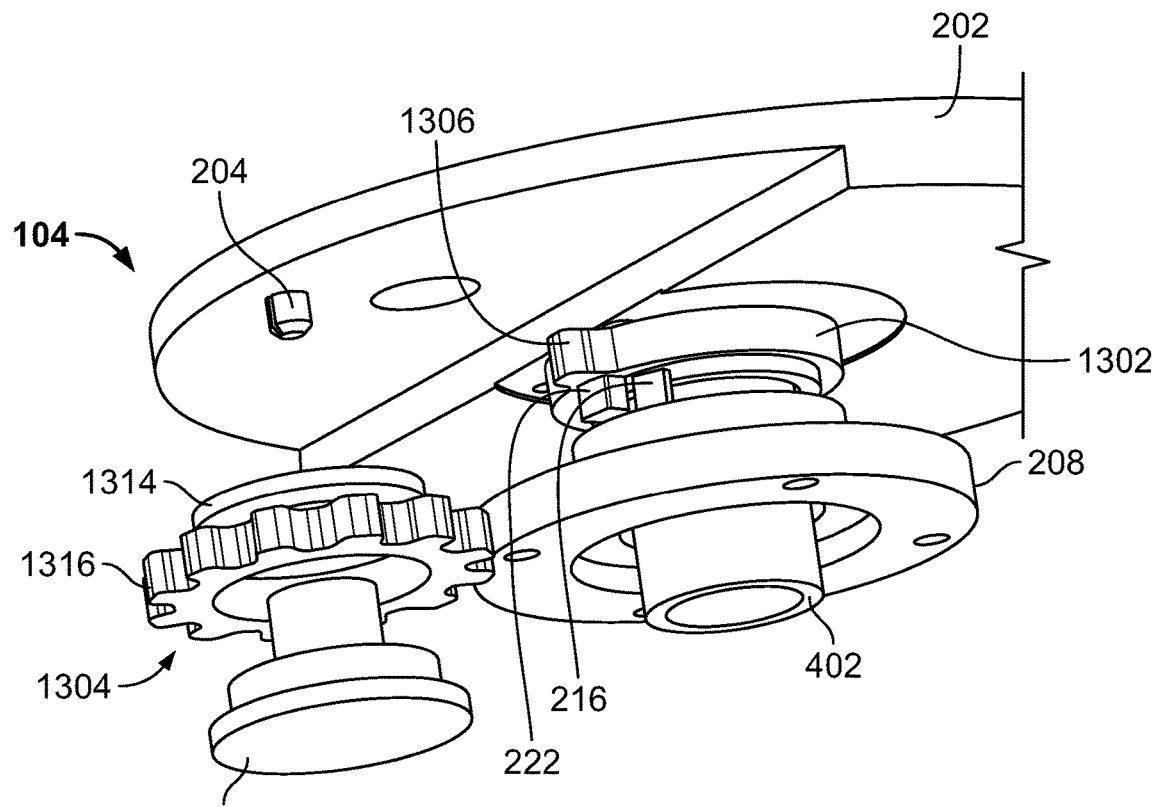

In yet another embodiment, which is depicted in FIGS. 13 and 14, the gimbal assembly 104 includes the mount flange 202, the anti-rotation pin 204, the gimbal 206 (not depicted in FIGS. 13 and 14), and the cover 208. However, rather than including the stop washer 212, this embodiment instead includes a gear washer 1302 and a gear 1304. The mount flange 202, as in the previous embodiments, is configured to be fixedly mounted against rotation, and the anti-rotation pin 204 is coupled to, and extends from, the mount flange 202. Also, as in the previous embodiments, the cover is fixedly mounted on the non-depicted gimbal 206 and is rotatable therewith, about the first rotational axis 106, in the first rotational direction 214-1 and in the second rotational direction 214-2. The cover 208 also includes the first engagement protrusion 216.

The gear washer 1302 is rotationally mounted on the mount flange 202 in a manner similar to the stop washer 212. That is, a guide washer 232 is fixedly mounted on the mount flange shaft 402, and the gear washer 1302 rotatable relative to the guide washer 232. Also similar to the stop washer 212, the gear washer 1302 is disposed between the cover 208 and the mount flange 202 and is rotatable, relative to the mount flange 202, about the first rotational axis 106, in the first rotational direction 214-1 and in the second rotational direction 214-2. While the gear washer 1302 also includes the rotation protrusion 222, it does not include the anti-rotation protrusion 218. Instead, it includes a gear engagement protrusion 1306 that extends radially outwardly from the gear washer 1302.

The gear 1304 is rotationally mounted on the mount flange 202 and is rotatable, relative to the mount flange 202, about a second rotational axis 1308 in the first rotational direction 214-1 and in the second rotational direction 214-2. As FIGS. 3 and 14 clearly depict, the second rotational axis 1308 is offset from the first rotational axis 106. Although the gear 1304 may be variously mounted to rotate relative to the mount flange 202, in the depicted embodiment, the gear 1304 is mounted on a mount shaft 1312 and is held in place with a gear bearing 1314.

No matter how the gear 1304 is specifically mounted for rotation, it includes a plurality of gear teeth 1316 and an anti-rotation protrusion 1318. Each of the gear teeth 1316 are selectively engaged by the gear engagement protrusion 1306 on the gear washer 1302. The anti-rotation protrusion 1318 extends toward the mount flange 202 and has a first engagement surface 1322 and a second engagement surface 1324. The anti-rotation protrusion 1318 selectively engages the anti-rotation pin 204, thereby selectively preventing rotation of the gear 1304, and thus the gear washer 1302 and cover 206.

In particular, the gear 1304 is rotatable in the first rotational direction 214-1 when the first engagement surface 1322 is not engaging the anti-rotation pin 204, and is rotatable in the second rotational direction 214-2 when the second engagement surface 1324 is not engaging the anti-rotation pin 204. The gear 1304 also prevents rotation of the cover 208 beyond a first predetermined number of rotations in the first rotational direction when the first engagement surface 1322 is engaging the anti-rotation pin 204, and prevents rotation of the cover 208 beyond a second predetermined number of rotations in the second rotational direction 214-2 when the second engagement surface 1324 is engaging the anti-rotation pin.

Figure 15:
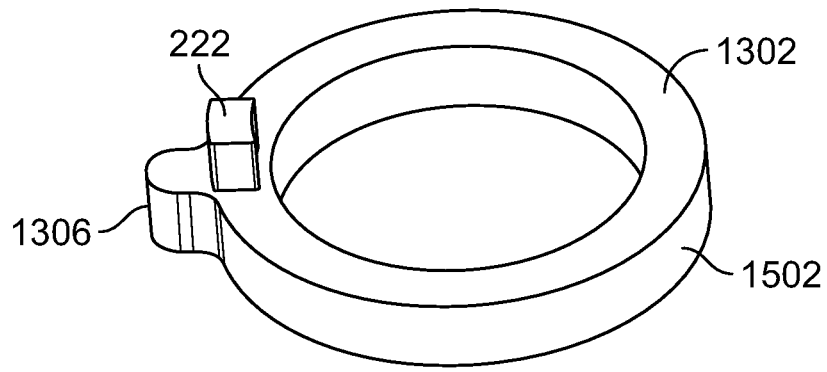
FIGS. 15-17 depicts plan views of different gear washers that may be used in the embodiment depicted in FIGS. 13 and 14.
Figure 16:
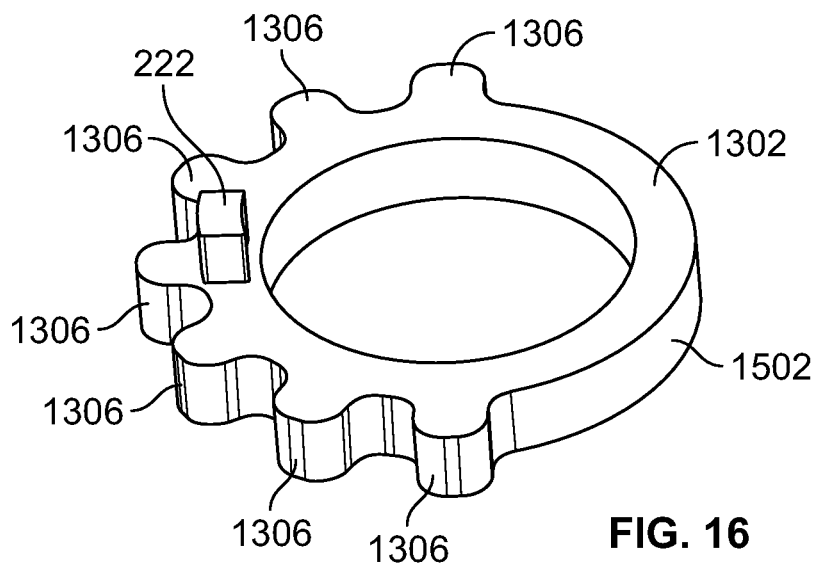
Figure 17:
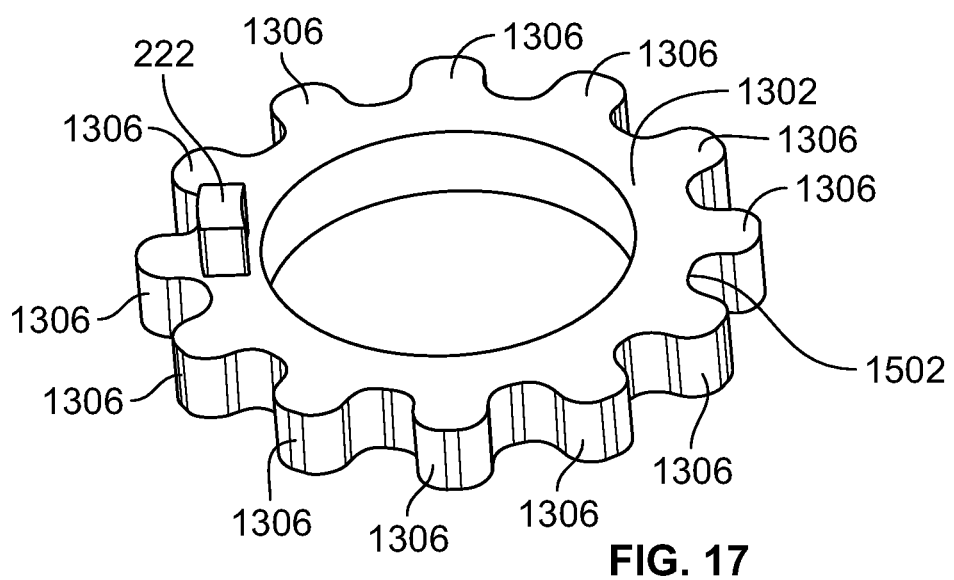

As may be appreciated, the gear washer 1302 and the gear 1304 together define a gear ratio, and it is this gear ratio that establishes the first and second predetermined number of rotations. The gear ratio can be established using any one of numerous known techniques. For example, the gear ratio can be established by the number of gear engagement protrusions 1306 on the gear washer 1302. In the embodiment depicted in FIGS. 13 and 14, and as shown more clearly in FIG. 15, the gear washer includes only one gear engagement protrusion 1306. In other embodiments, however, the gear washer 1302 may include a plurality of gear engagement protrusions 1306 that each extend radially outwardly from the gear washer 1302. The number of gear engagement protrusions 1306 may vary, but when a plurality of gear engagement protrusions 136 are included, the gear engagement protrusions 1306 are evenly spaced. In some embodiments, such as the one depicted in FIG. 16, the gear engagement protrusions 1306 are evenly spaced around a portion of the outer surface 1502 of the gear washer 1302. In the embodiment depicted in FIG. 17, the plurality of gear engagement protrusions 1306 are evenly spaced around the entirety of the outer surface 1502.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gimbal assembly, comprising:
   a mount flange configured to be fixedly mounted against rotation;
   an anti-rotation pin coupled to, and extending from, the mount flange;
   a gimbal rotationally mounted on the mount flange and rotatable, relative to the mount flange, about a rotational axis in a first rotational direction and in a second rotational direction that is opposite the first rotational direction;
   a cover fixedly mounted on the gimbal and rotatable therewith about the rotational axis in the first rotational direction and in the second rotational direction, the cover including a first engagement protrusion, the first engagement protrusion extending from the cover toward the mount flange; and
   a stop washer rotationally mounted on the mount flange and disposed between the cover and the mount flange, the stop washer rotatable, relative to the mount flange, about the rotational axis in the first rotational direction and in the second rotational direction, the stop washer including an anti-rotation protrusion and a rotation protrusion, the anti-rotation protrusion extending radially outwardly from the stop washer and having a first engagement surface and a second engagement surface, the rotation protrusion extending toward the cover, wherein the stop washer:
is rotatable in the first rotational direction when the first engagement surface is not engaging the anti-rotation pin,
is rotatable in the second rotational direction when the second engagement surface is not engaging the anti-rotation pin,
prevents rotation of the cover beyond a first predetermined number of rotations in the first rotational direction when the first engagement surface is engaging the anti-rotation pin, and
prevents rotation of the cover beyond a second predetermined number of rotations in the second rotational direction when the second engagement surface is engaging the anti-rotation pin.

2. The gimbal assembly of claim 1, wherein:
the anti-rotation protrusion is a first anti-rotation protrusion;
the stop washer further comprises a second anti-rotation protrusion; and
the first and second anti-rotation protrusions are spaced apart by 90-degrees.

3. The gimbal assembly of claim 1, wherein:
the mount flange includes a shaft; and
the cover and stop washer each surround the shaft.

4. The gimbal assembly of claim 3, further comprising:
a guide washer disposed between the stop washer and the shaft, the guide washer fixedly mounted on the shaft, the stop washer rotatable relative to the guide washer.

5. The gimbal assembly of claim 1, further comprising:
one or more rotary washers rotationally mounted on the mount flange and disposed between the cover and the stop washer, each rotary washer rotatable about the rotational axis in the first rotational direction and in the second rotational direction, each rotary washer including a second engagement protrusion and a third engagement protrusion, each second engagement protrusion extending toward the cover, each third engagement protrusion extending toward the stop washer.

6. The gimbal assembly of claim 1, further comprising:
N-number of rotary washers rotationally mounted on the mount flange and disposed between the cover and the stop washer, each of the rotary washers rotatable about the rotational axis in the first rotational direction and in the second rotational direction, each of the rotary washers including a second engagement protrusion and a third engagement protrusion, each second engagement protrusion extending toward the cover, each third engagement protrusion extending toward the stop washer.

7. The gimbal assembly of claim 1, wherein the first predetermined number of rotations and the second predetermined number of rotations are equal to N+2.

8. The gimbal assembly of claim 7, wherein:
the mount flange includes a shaft; and
the cover, the stop washer, and the rotary washers each surround the shaft.

9. The gimbal assembly of claim 8, further comprising:
a first guide washer disposed between the stop washer and the shaft, the first guide washer fixedly mounted on the shaft, the stop washer rotatable relative to the first guide washer; and
a plurality of second guide washers, each of the second guide washers associated with a different one of the rotary washers, each of the second guide washers disposed between the shaft and its associated rotary washer, each of the second guide washers fixedly mounted on the shaft, each of the rotary washers rotatable relative to its associated guide washer.

10. The gimbal assembly of claim 1, further comprising:
a stationary structure fixedly coupled to the mount flange, the stationary structure having first helical threads formed on an outer surface thereof,
wherein the stop washer has second helical threads formed on an inner surface thereof that engage and mate with the first helical threads.

11. The gimbal assembly of claim 10, wherein the first predetermined number of rotations and the second predetermined number of rotations are both greater than one.

12. A gimbal assembly, comprising:
a mount flange configured to be fixedly mounted against rotation;
an anti-rotation pin coupled to, and extending from, the mount flange;
a gimbal rotationally mounted on the mount flange and rotatable, relative to the mount flange, about a first rotational axis in a first rotational direction and in a second rotational direction that is opposite the first rotational direction;
a cover fixedly mounted on the gimbal and rotatable therewith about the first rotational axis in the first rotational direction and in the second rotational direction, the cover including a first engagement protrusion, the first engagement protrusion extending from the cover toward the mount flange;
a gear washer rotationally mounted on the mount flange and disposed between the cover and the mount flange, the gear washer rotatable, relative to the mount flange, about the first rotational axis in the first rotational direction and in the second rotational direction, the gear washer including a gear engagement protrusion and a rotation protrusion, the gear rotation protrusion extending radially outwardly from the gear washer; and
a gear rotationally mounted on the mount flange, the gear rotatable, relative to the mount flange, about a second rotational axis in the first rotational direction and in the second rotational direction, the second rotational axis offset from the first rotational axis, the gear including a plurality of gear teeth and an anti-rotation protrusion, each of the gear teeth selectively engaged by the gear engagement protrusion, the anti-rotation protrusion extending toward the mount flange and having a first engagement surface and a second engagement surface, wherein the gear:
is rotatable in the first rotational direction when the first engagement surface is not engaging the anti-rotation pin,
is rotatable in the second rotational direction when the second engagement surface is not engaging the anti-rotation pin,
prevents rotation of the cover beyond a first predetermined number of rotations in the first rotational direction when the first engagement surface is engaging the anti-rotation pin, and
prevents rotation of the cover beyond a second predetermined number of rotations in the second rotational direction when the second engagement surface is engaging the anti-rotation pin.

13. The gimbal assembly of claim 12, wherein the gear washer includes a plurality of gear engagement protrusions.

14. The gimbal assembly of claim 13, wherein:
the gear rotation protrusions extend radially outwardly from an outer surface of the gear washer;
the plurality of gear engagement protrusions are evenly spaced around at least a portion of the outer surface.

15. The gimbal assembly of claim 13, wherein:
the gear rotation protrusions extend radially outwardly from an outer surface of the gear washer;
the plurality of gear engagement protrusions are evenly spaced around an entirety of the outer surface.

16. The gimbal assembly of claim 12, wherein:
the gear washer and the gear together define a gear ratio; and
the gear ratio establishes the first predetermined number of rotations and the second predetermined number of rotations.

17. A mobile system, comprising:
a mobile platform; and
a gimbal assembly coupled to the mobile platform and rotatable, by more than a single rotation, about a rotational axis, the gimbal assembly comprising:
  a mount flange fixedly mounted against rotation;
  an anti-rotation pin coupled to, and extending from, the mount flange;
  a gimbal rotationally mounted on the mount flange and rotatable, relative to the mount flange, about the rotational axis in a first rotational direction and in a second rotational direction that is opposite the first rotational direction;
  a cover fixedly mounted on the gimbal and rotatable therewith about the rotational axis in the first rotational direction and in the second rotational direction, the cover including a first engagement protrusion, the first engagement protrusion extending from the cover toward the mount flange; and
  a stop washer rotationally mounted on the mount flange and disposed between the cover and the mount flange, the stop washer rotatable, relative to the mount flange, about the rotational axis in the first rotational direction and in the second rotational direction, the stop washer including an anti-rotation protrusion and a rotation protrusion, the anti-rotation protrusion extending radially outwardly from the stop washer and having a first engagement surface and a second engagement surface, the rotation protrusion extending toward the cover,
  wherein the stop washer:
    is rotatable in the first rotational direction when the first engagement surface is not engaging the anti-rotation pin,
    is rotatable in the second rotational direction when the second engagement surface is not engaging the anti-rotation pin,
    prevents rotation of the cover beyond a first predetermined number of rotations in the first rotational direction when the first engagement surface is engaging the anti-rotation pin, and
    prevents rotation of the cover beyond a second predetermined number of rotations in the second rotational direction when the second engagement surface is engaging the anti-rotation pin.

18. The system of claim 17, further comprising a device coupled to the gimbal and rotatable therewith.

19. The system of claim 18, wherein the device includes one or more of a compass, a camera, and a laser.

20. The system of claim 17, wherein the mobile platform comprises an unmanned aerial vehicle.

* * * * *